United States Patent
Kita

(10) Patent No.: US 12,007,752 B2
(45) Date of Patent: Jun. 11, 2024

(54) INFORMATION PROCESSING APPARATUS, DISPLAY CONTROL METHOD, STORAGE MEDIUM, SUBSTRATE PROCESSING SYSTEM, AND METHOD FOR MANUFACTURING ARTICLE

(71) Applicant: CANON KABUSHIKI KAISHA, Tokyo (JP)

(72) Inventor: Kenta Kita, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/240,403

(22) Filed: Apr. 26, 2021

(65) Prior Publication Data
US 2021/0333782 A1 Oct. 28, 2021

(30) Foreign Application Priority Data
Apr. 28, 2020 (JP) ................................. 2020-079054

(51) Int. Cl.
*G05B 19/418* (2006.01)
*G06F 3/04842* (2022.01)

(52) U.S. Cl.
CPC ..... *G05B 19/4183* (2013.01); *G06F 3/04842* (2013.01)

(58) Field of Classification Search
CPC ........................ G05B 19/4183; G06F 3/04842
See application file for complete search history.

(56) References Cited

U.S. PATENT DOCUMENTS

| | | | |
|---|---|---|---|
| 7,475,122 B2* | 1/2009 | Azpitarte | G06F 11/0748 702/182 |
| 7,684,075 B2* | 3/2010 | Matsumae | G03G 15/5079 714/48 |
| 9,437,465 B2* | 9/2016 | Takahata | G05B 19/41875 |
| 10,984,520 B2* | 4/2021 | Ueda | G06Q 50/04 |
| 2002/0009175 A1* | 1/2002 | Kurosawa | G03F 9/7034 378/146 |
| 2002/0064138 A1* | 5/2002 | Saito | G05B 19/41865 370/282 |
| 2002/0091971 A1* | 7/2002 | Sawada | H04N 1/2392 714/46 |

(Continued)

FOREIGN PATENT DOCUMENTS

| | | |
|---|---|---|
| CN | 110244669 A | 9/2019 |
| CN | 110609450 A | 12/2019 |

(Continued)

*Primary Examiner* — Jeremy L Stanley
(74) *Attorney, Agent, or Firm* — Canon U.S.A., Inc. IP Division

(57) ABSTRACT

An information processing apparatus for controlling display on a user interface includes an acquisition unit, and a display control unit. The acquisition unit acquires information including an operated state indicating a state regarding an operation performed on each of a plurality of apparatuses, and an operating state indicating a state regarding an operating status of each of the plurality of apparatuses. The display control unit controls display of the information regarding an apparatus identified from among the plurality of apparatuses on the user interface, based on the information including the operated state and the operating state acquired by the acquisition unit.

14 Claims, 12 Drawing Sheets

(56) References Cited

U.S. PATENT DOCUMENTS

| | | | |
|---|---|---|---|
| 2002/0183880 A1* | 12/2002 | Arima | G06Q 30/04 700/121 |
| 2004/0073327 A1* | 4/2004 | Shimada | G05B 19/4184 700/108 |
| 2004/0225384 A1* | 11/2004 | Onishi | G05B 23/0283 700/90 |
| 2006/0070014 A1* | 3/2006 | Liu | G05B 23/0267 438/14 |
| 2006/0215338 A1* | 9/2006 | Yokouchi | H01L 21/6831 361/56 |
| 2008/0147226 A1* | 6/2008 | Matsushita | G05B 19/41875 700/110 |
| 2009/0072990 A1* | 3/2009 | Iida | G05B 23/0267 340/691.5 |
| 2009/0082984 A1* | 3/2009 | Wakamiya | G06F 11/0769 702/85 |
| 2009/0118855 A1* | 5/2009 | Joho | G05B 19/4183 700/108 |
| 2011/0095899 A1* | 4/2011 | Saito | B61L 15/0036 340/691.6 |
| 2011/0264250 A1* | 10/2011 | Nishimura | C23C 14/24 251/356 |
| 2012/0084031 A1* | 4/2012 | Saito | G05B 19/4184 702/62 |
| 2012/0251996 A1* | 10/2012 | Jung | G05B 19/4183 434/365 |
| 2012/0323855 A1* | 12/2012 | Koyama | G05B 19/41875 707/661 |
| 2013/0304419 A1 | 11/2013 | Nakamura | |
| 2014/0316588 A1* | 10/2014 | Giera | F04B 49/065 700/282 |
| 2015/0096494 A1* | 4/2015 | Nishiura | C23C 16/52 118/697 |
| 2015/0148935 A1* | 5/2015 | Koshimaki | G05B 19/4183 700/121 |
| 2015/0181058 A1* | 6/2015 | Adachi | G06F 3/1229 358/1.15 |
| 2016/0056064 A1* | 2/2016 | Miki | H01L 21/67288 702/182 |
| 2016/0092808 A1* | 3/2016 | Cheng | G06Q 10/0639 705/7.28 |
| 2017/0285613 A1* | 10/2017 | Asai | G05B 19/406 |
| 2017/0315961 A1* | 11/2017 | Natsumeda | G06N 5/04 |
| 2018/0120822 A1* | 5/2018 | Asai | C23C 16/46 |
| 2018/0294174 A1* | 10/2018 | Fujikata | H01L 21/67288 |
| 2019/0012847 A1* | 1/2019 | Fukuda | H01L 21/67178 |
| 2019/0265924 A1* | 8/2019 | Ikeda | G06F 3/1221 |
| 2019/0298084 A1* | 10/2019 | Billings | A47F 3/0426 |
| 2019/0327463 A1* | 10/2019 | Zhao | H04N 19/103 |
| 2020/0009703 A1* | 1/2020 | Joo | B24B 37/30 |
| 2020/0057689 A1* | 2/2020 | Farahat | G06F 11/0751 |
| 2020/0058081 A1* | 2/2020 | Saneyoshi | G06Q 10/06 |
| 2020/0192324 A1* | 6/2020 | Asai | G05B 19/406 |
| 2020/0193354 A1* | 6/2020 | Nogi | G06Q 10/06393 |
| 2020/0310393 A1 | 10/2020 | Nakaya | |
| 2020/0310733 A1* | 10/2020 | Fujimura | G06F 3/04883 |
| 2020/0356094 A1* | 11/2020 | Gagne | G01S 17/89 |
| 2021/0124341 A1* | 4/2021 | Nakasato | G05B 23/0221 |
| 2021/0264076 A1* | 8/2021 | Yamamoto | H01L 21/67288 |
| 2021/0278832 A1* | 9/2021 | Koumoto | G05B 23/0283 |
| 2021/0294491 A1* | 9/2021 | Ohtaka | G06F 3/04817 |
| 2022/0147038 A1* | 5/2022 | Akutsu | G06F 3/14 |

FOREIGN PATENT DOCUMENTS

| | | |
|---|---|---|
| JP | 2004133620 A | 4/2004 |
| JP | 2005072259 A | 3/2005 |
| JP | 2008112209 A | 5/2008 |
| JP | 2011090571 A | 5/2011 |
| JP | 2011134335 A | 7/2011 |
| JP | 2016-045626 A | 4/2016 |
| TW | 200901269 A | 1/2009 |
| TW | 201942867 A | 11/2019 |
| WO | 2009/085534 A1 | 7/2009 |
| WO | 2019073793 A1 | 4/2019 |

* cited by examiner

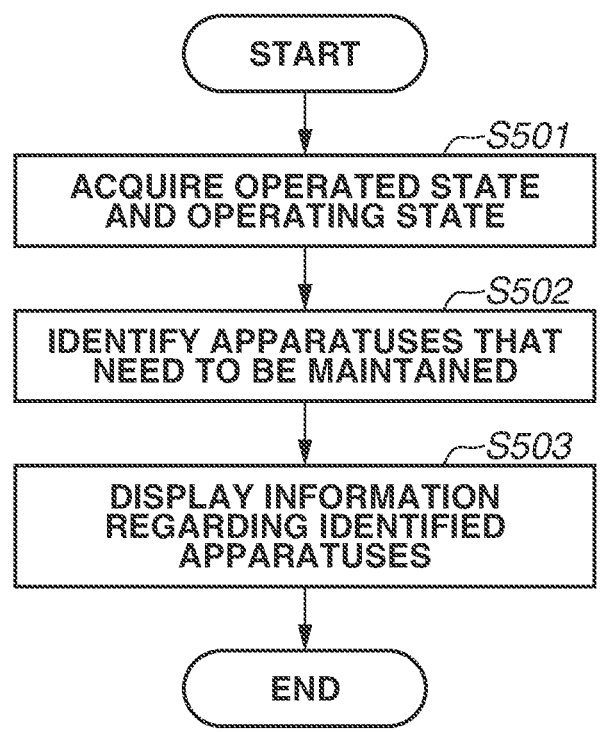

FIG.6

| Factory | Apparatus | Operated State | Operating State | State Time |
|---|---|---|---|---|
| Factory X | Apparatus A | Online/Remote | Reset | 00:05:00 |
| | Apparatus B | Online/Remote | Idle | — |
| | Apparatus C | Online/Remote | Processing | — |
| Factory Y | Apparatus D | Online/Local | MA | 00:30:00 |
| | Apparatus E | Online/Remote | Idle | — |
| | Apparatus F | Online/Remote | Down | 00:15:00 |
| Factory Z | Apparatus G | Online/Remote | Processing | — |
| | Apparatus H | Online/Remote | Reset | 00:10:00 |
| | Apparatus I | Online/Remote | MA | 00:20:00 |

FIG.11

| Procedure Information |
|---|
| Procedure 1 |
| Procedure 2 |
| Procedure 3 |
| Procedure 4 |
| Procedure 5 |
| Procedure 6 |
| Procedure 7 |
| Procedure 8 |
| Procedure 9 |
| Procedure 10 |

1101

INFORMATION PROCESSING APPARATUS, DISPLAY CONTROL METHOD, STORAGE MEDIUM, SUBSTRATE PROCESSING SYSTEM, AND METHOD FOR MANUFACTURING ARTICLE

BACKGROUND OF THE INVENTION

Field of the Invention

The present invention relates to an information processing apparatus, a display control method, a storage medium, a substrate processing system, and a method for manufacturing an article.

Description of the Related Art

In a case where an abnormality occurs in an apparatus for manufacturing an article, such as a semiconductor device, it is necessary to quickly perform maintenance for recovering from the abnormality to prevent a reduction in productivity.

Japanese Patent Application Laid-Open No. 2016-45626 discusses the following maintenance assistance apparatus. With the task of assisting a user in grasping the state of an apparatus (equipment) accurately and maintaining the apparatus at an appropriate time, a maintenance assistance apparatus that assists the maintenance of an apparatus includes an output unit that outputs information regarding the state of the apparatus based on apparatus information and operating state information.

It is, however, occasionally difficult to simultaneously maintain a plurality of apparatuses in a state where the plurality of apparatuses has an abnormality and needs to be maintained. In this case, the plurality of apparatuses is maintained in order, and therefore it is desired to identify an apparatus to be preferentially maintained.

SUMMARY OF THE INVENTION

The present invention is directed to providing a technique advantageous for identifying an apparatus that is desired to be preferentially maintained.

An information processing apparatus as one aspect of the present invention controls display on a user interface and includes an acquisition unit, and a display control unit. The acquisition unit acquires information including an operated state indicating a state regarding an operation performed on each of a plurality of apparatuses, and an operating state indicating a state regarding an operating status of each of the plurality of apparatuses. The display control unit controls display of the information regarding an apparatus identified from among the plurality of apparatuses on the user interface, based on the information including the operated state and the operating state acquired by the acquisition unit.

Further features of the present invention will become apparent from the following description of exemplary embodiments with reference to the attached drawings.

BRIEF DESCRIPTION OF THE DRAWINGS

FIG. 5 illustrates a display process for displaying a user interface.

FIG. 6 illustrates an operated state, an operating state, and a state time of the exposure apparatus.

FIG. 11 illustrates a screen for displaying a procedure for maintaining an apparatus according to the third exemplary embodiment.

DESCRIPTION OF THE EMBODIMENTS

Figure 1:
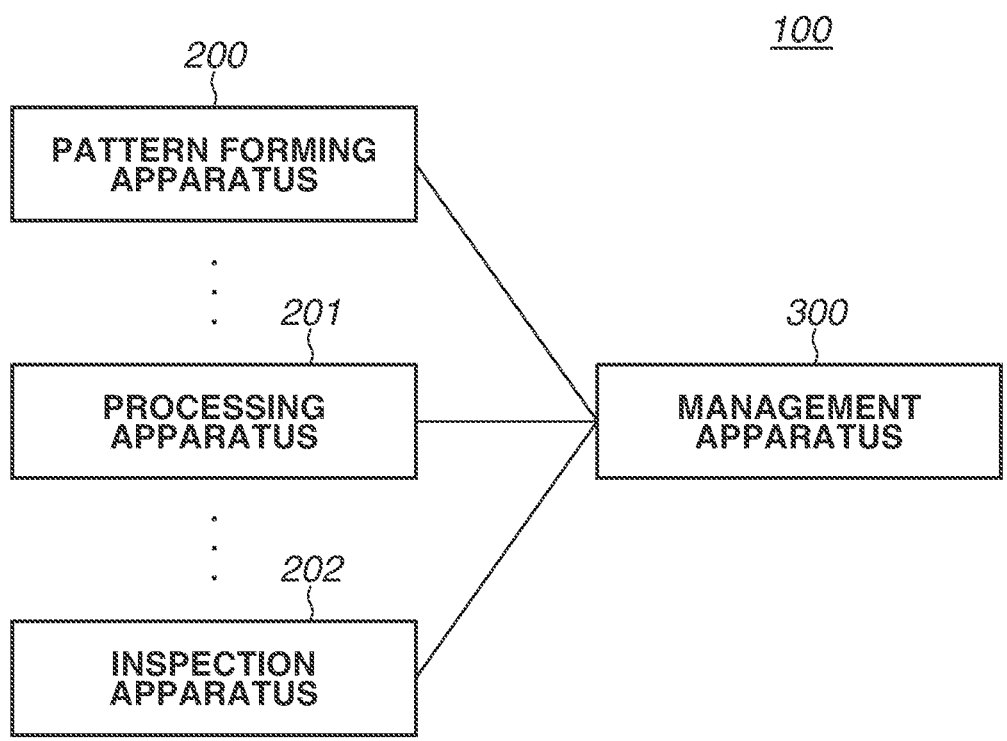
FIG. 1 illustrates a substrate processing system.

Desirable exemplary embodiments of the present invention will now be described in detail with reference to the drawings. In the drawings, the same members are designated by the same reference numbers, and are not redundantly described.

In a first exemplary embodiment, a description is given of a substrate processing system composed of a plurality of apparatuses and a management apparatus that manages the plurality of apparatuses. FIG. 1 is a diagram illustrating the substrate processing system. A substrate processing system 100 according to the present exemplary embodiment includes a plurality of apparatuses, such as a pattern forming apparatus 200 that forms a pattern on a wafer (a substrate), a processing apparatus 201, and an inspection apparatus 202, and a management apparatus 300 that manages the plurality of apparatuses. In the substrate processing system 100, each of the pattern forming apparatus 200, the processing apparatus 201, and the inspection apparatus 202 includes one or more apparatuses.

Examples of the pattern forming apparatus 200 include an exposure apparatus that emits light to a reticle (a mask or an original) on which a pattern is formed, thereby projecting the pattern onto a shot region on a wafer with the light emitted from the reticle. Examples of the pattern forming apparatus 200 also include an imprint apparatus that brings an imprint material supplied onto a wafer and a mold (an original) into contact with each other and gives curing energy to the imprint material, thereby forming a composition to which the shape of the mold is transferred. Examples of the pattern forming apparatus 200 also include a drawing apparatus that performs drawing on a substrate with a charged particle beam, such as an electron beam or an ion beam, through a charged particle optical system, thereby forming a pattern on the substrate. The pattern forming apparatus 200 executes substrate processing by these methods.

Examples of the processing apparatus 201 include a substrate processing apparatus that performs a step other than the steps performed by the pattern forming apparatus 200 in the manufacturing of an article such as a device. The substrate processing apparatus is, for example, an application apparatus that applies a photosensitive medium onto the surface of a substrate, or a developing apparatus that develops a substrate to which a pattern is transferred. Further, examples of the processing apparatus 201 include a planarization apparatus, an etching apparatus, and a film forming apparatus.

Examples of the inspection apparatus 202 include an overlay inspection apparatus, a line width inspection apparatus, a pattern inspection apparatus, and an electrical characteristic inspection apparatus. The overlay inspection apparatus is an apparatus that, in a substrate in which patterns are formed on multiple layers, inspects the degree of the positional shift between a pattern on an upper layer and a pattern on a lower layer. The line width inspection apparatus is an apparatus that inspects the accuracy of the dimension, such as the line width, of a pattern formed on a substrate. The pattern inspection apparatus is an apparatus that inspects the presence or absence of a pattern that does not satisfy an accuracy due to a foreign substance attached onto a substrate on which a pattern is formed, or due to the fact that a substrate is not filled with an imprint material. The electrical characteristic inspection apparatus is an apparatus that inspects the accuracy of the electrical characteristics of, for example, a semiconductor device manufactured from a substrate on which a pattern is formed.

Figure 2:
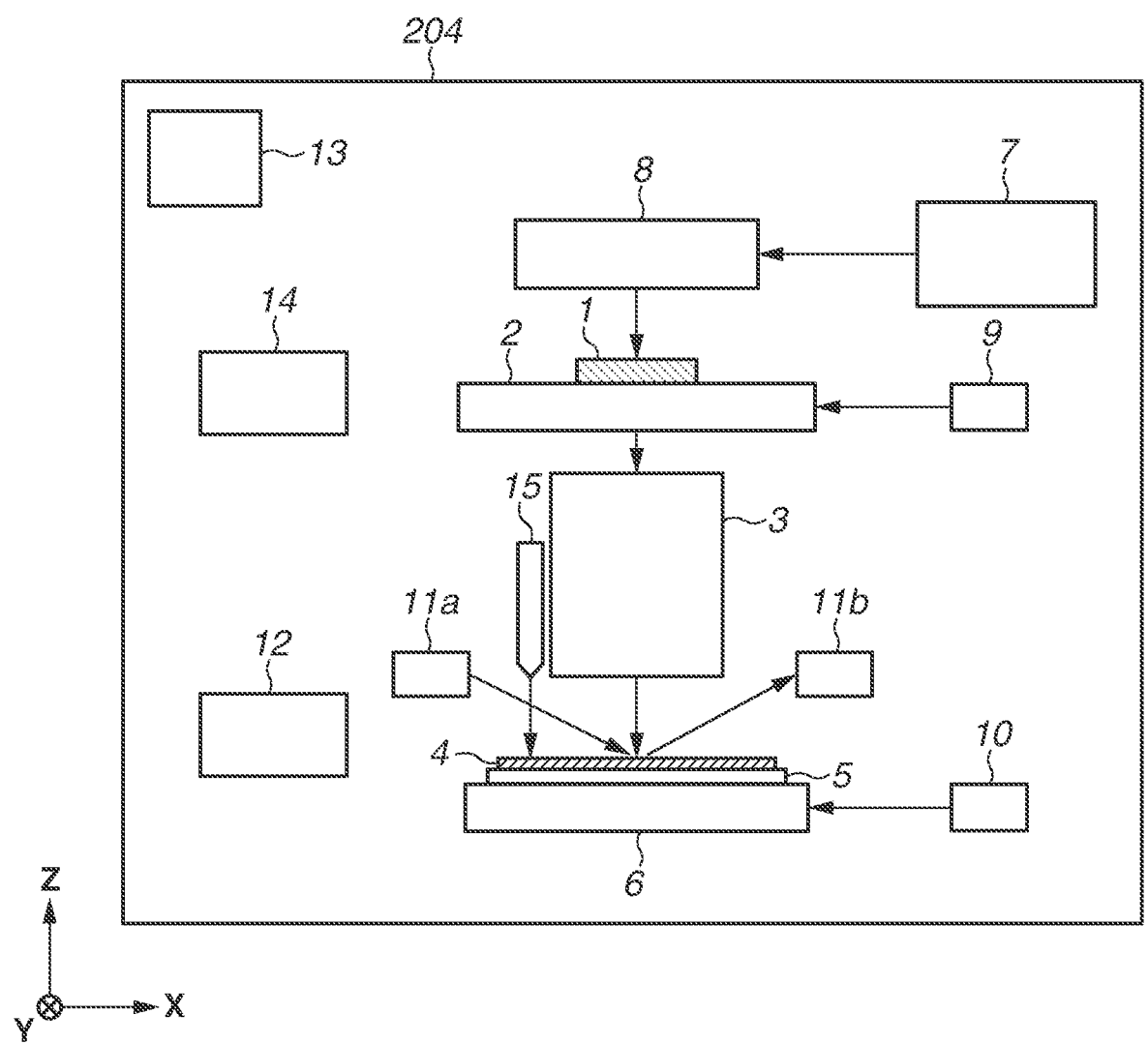
FIG. 2 illustrates an exposure apparatus as an example of a pattern forming apparatus.

Next, as an example of the pattern forming apparatus 200, a description is given of an exposure apparatus that exposes a wafer with light emitted from a reticle on which a pattern is formed. FIG. 2 is a diagram illustrating the exposure apparatus as an example of the pattern forming apparatus 200. An exposure apparatus 204 according to the present exemplary embodiment is described as a step-and-scan exposure apparatus that exposes a wafer while synchronously driving a reticle stage and a wafer stage. The exposure apparatus 204 is not limited to a scanner, and may be a step-and-repeat exposure apparatus that exposes a wafer in a state where a wafer stage is at rest. In the example of FIG. 2, the exposure apparatus 204 includes a light source 7, an illumination optical system 8, a reticle stage 2, a projection optical system 3, a wafer stage 6, a wafer chuck 5, and a control unit 13. The exposure apparatus 204 also includes a laser interferometer 9, a laser interferometer 10, a focus sensor, a wafer conveying unit 12, a reticle conveying unit 14, and an alignment scope 15. In FIG. 2, a direction parallel to the optical axis of the projection optical system 3 is a Z-axis direction, and two directions orthogonal to each other in a plane perpendicular to the Z-axis direction are an X-axis direction and a Y-axis direction.

Examples of the light source 7 include a high-pressure mercury lamp, an argon fluoride (ArF) excimer laser, and a krypton fluoride (KrF) excimer laser. The light source 7 is not necessarily located within a chamber of the exposure apparatus 204. There can also be a configuration in which the light source 7 is externally attached to the exposure apparatus 204. Light emitted from the light source 7 illuminates a reticle 1 through the illumination optical system 8. On the reticle 1, a pattern to be transferred to a wafer 4 to which a photosensitive material is applied is drawn. The reticle 1 is mounted on the reticle stage 2. The reticle stage 2 holds the reticle 1 in a suction manner through a reticle chuck, and the reticle stage 2 is configured to move by, for example, a linear motor.

The projection optical system 3 projects an image of the pattern drawn on the reticle 1 onto the wafer 4 placed on the wafer chuck 5. When the image of the pattern is projected onto the wafer 4, an image obtained by inverting and reducing the image of the pattern with a projection magnification (e.g., a quarter) through the projection optical system 3 is projected onto the wafer 4. If a region onto which the image of the pattern is projected is defined as a shot region, a plurality of shot regions is set in the wafer 4, and the image of the pattern is sequentially and repeatedly projected onto the shot regions.

The wafer stage 6 can move in the X-direction and the Y-direction by being driven by, for example, an actuator of a linear motor. The wafer chuck 5 is mounted on the wafer stage 6 and holds the wafer 4. The wafer stage 6 positions the wafer chuck 5 in the Z-direction, a θ-direction, an ωX-direction, and an ωY-direction. The wafer 4 thus held by the wafer chuck 5 moves by the driving of the wafer stage 6 and the wafer chuck 5.

The laser interferometer 9 measures the position in the Y-direction of the reticle stage 2 and measures the orientation of the reticle stage 2. The laser interferometer 9 includes a laser interferometer for similarly measuring the position in the X-direction of the reticle stage 2. The laser interferometer 10 measures the position in the Y-direction of the wafer stage 6 on which the wafer 4 is mounted, and measures the orientation of the wafer stage 6. The laser interferometer 10 includes a laser interferometer for similarly measuring the position in the X-direction of the wafer stage 6. The positions of the reticle stage 2 and the wafer stage 6 are controlled by the control unit 13 based on the positions measured by the laser interferometer 9 and the laser interferometer 10, respectively.

The focus sensor includes a light projection system 11a that projects light onto the wafer 4, a light reception system 11b that receives the reflected light from the wafer 4, and a detection unit that detects the light received by the light reception system 11b and outputs a detection signal to the control unit 13. The light projection system 11a and the light reception system 11b are installed to sandwich the vicinity of a light emission portion of the projection optical system 3. The light projection system 11a emits obliquely incident light to the wafer 4, and the light reception system 11b captures the reflected light on the opposite side. Based on a detection signal detected by the focus sensor, the below-described control unit 13 measures the position in the Z-direction of the wafer 4 and controls the wafer stage 6 to move the wafer 4.

The wafer conveying unit 12 conveys the wafer 4. The wafer conveying unit 12 conveys the wafer 4 from, for example, a wafer storage container that stores the wafer 4 to the wafer stage 6. The wafer conveying unit 12 also conveys the wafer 4 from the wafer stage 6 to the wafer storage container.

The reticle conveying unit 14 conveys the reticle 1. The reticle conveying unit 14 conveys the reticle 1 from, for example, a reticle storage container that stores the reticle 1 to the reticle stage 2. The reticle conveying unit 14 also conveys the reticle 1 from the reticle stage 2 to the reticle storage container.

To position (align) the wafer 4 held by the wafer chuck 5, the alignment scope 15 acquires a digital image signal obtained by capturing a mark formed on the wafer 4. The alignment scope 15 includes an image sensor that outputs an intensity image signal according to the brightness, i.e., the intensity, of reflected light from the wafer 4, and an analog-to-digital (A/D) converter that converts the intensity image signal obtained from the image sensor into a digital image signal. The below-described control unit 13 detects the position of the mark formed on the wafer 4 using the acquired digital image signal. Based on the detected position of the mark, the control unit 13 controls the wafer stage 6 to position the wafer 4.

The control unit 13 controls an exposure process performed on the wafer 4 by controlling operations and adjustments of the components of the exposure apparatus 204. The control unit 13 is composed of, for example, a programmable logic device (PLD) such as a field-programmable gate array (FPGA), an application-specific integrated circuit (ASIC), a computer in which a program is incorporated, or a combination of all or some of these. The control unit 13 may be configured integrally (in a common housing) with the other portions of the exposure apparatus 204, or may be configured separately (in a different housing) from the other portions of the exposure apparatus 204. The control unit 13 applies information acquired from a storage device described below and performs control to execute the exposure process (a pattern forming process) on the wafer 4.

Figure 3:
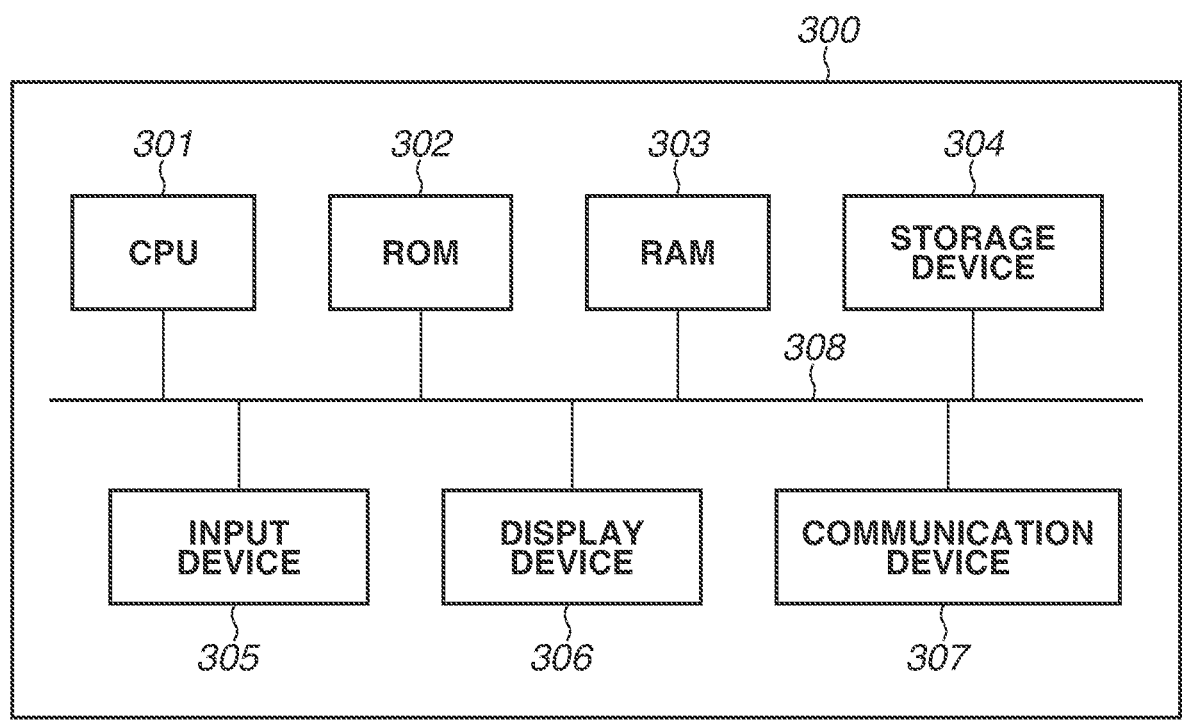
FIG. 3 illustrates a hardware configuration of an information processing apparatus.

The management apparatus 300 is now described. The management apparatus 300 includes one or more information processing apparatuses. FIG. 3 is a diagram illustrating a hardware configuration of each of the one or more information processing apparatuses. The information processing apparatus includes a central processing unit (CPU) 301, a read-only memory (ROM) 302, a random-access memory (RAM) 303, a storage device 304, an input device 305, a display device 306, and a communication device 307. The hardware components of the information processing apparatus function according to a program. In the example illustrated in FIG. 3, the CPU 301 is a processing apparatus that performs calculation for control according to a program and controls the components connected to a bus 308. The ROM 302 is a memory dedicated to the reading of data, and stores a program and data. The RAM 303 is a memory from and to which data is read and written, and is used to save a program and data. The RAM 303 is used to temporarily save data of the result of calculation performed by the CPU 301. The storage device 304 is also used to save a program and data. The storage device 304 is used also as a temporary storage area for a program of an operating system (OS) of the information processing apparatus, and data.

Regarding the input and output of data, the storage device 304 is slower than the RAM 303. However, the storage device 304 can save a large amount of data. It is desirable that the storage device 304 is a non-volatile storage device capable of saving data as permanent data, so that data saved in the storage device 304 can be referenced over a long period. The storage device 304 is mainly composed of a magnetic storage device (a hard disk drive (HDD)), but may be a device that reads and writes data with an external medium, such as a compact disc (CD), a digital versatile disc (DVD), or a memory card, attached to the device.

The input device 305 and the display device 306 function as user interfaces of the management apparatus 300. The input device 305 is a device for inputting characters or data to the information processing apparatus. Examples of the input device 305 include various kinds of keyboards and a mouse. The display device 306 is a device for displaying information used for the operation of the information processing apparatus or a processing result. Examples of the display device 306 include a cathode ray tube (CRT) or liquid crystal monitor. Display on the display device 306 is controlled by the CPU 301. The input device 305 and the display device 306 are described as parts of the management apparatus 300, but are not limited to this. These devices may be parts of, for example, the pattern forming apparatus 200.

The communication device 307 is used to connect to a network, perform data communication based on a communication protocol, such as the Transmission Control Protocol/Internet Protocol (TCP/IP), and communicate with another apparatus. To enable a high-speed calculation process, the information processing apparatus may include a graphics processing unit (GPU). The management apparatus 300 is an information processing apparatus and is connected to a plurality of exposure apparatuses 204 via the communication device 307 to communicate data with the plurality of exposure apparatuses 204.

Figure 4:
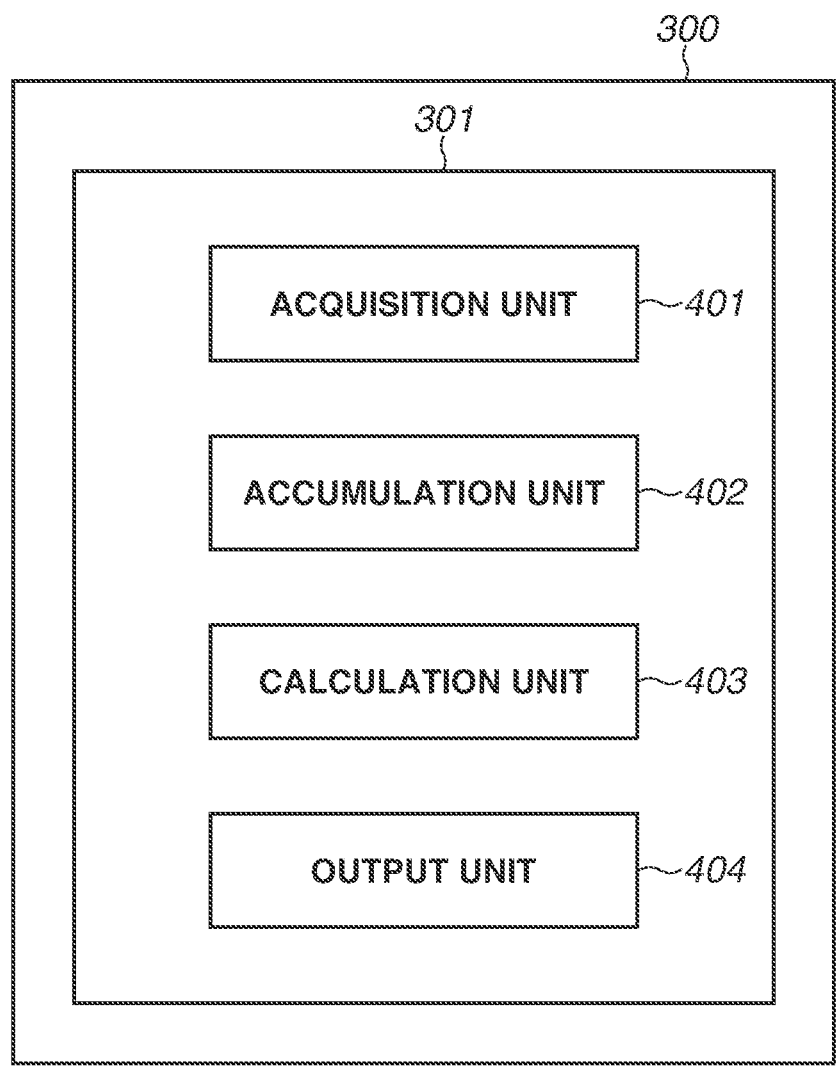
FIG. 4 illustrates a configuration of a central processing unit (CPU) of a management apparatus.

With reference to FIGS. 4 and 5, a description will now be given of a display process for displaying a user interface in the management apparatus 300 according to the present exemplary embodiment. FIG. 4 is a diagram illustrating the configuration of the CPU 301 of the management apparatus 300. The CPU 301 includes an acquisition unit 401, an accumulation unit 402, a calculation unit 403, and an output unit 404. The output unit 404 is also a display control unit that controls display on the display device 306. FIG. 5 is a flowchart illustrating a display process for displaying a user interface.

In FIG. 5, a display process for displaying a user interface for identifying an apparatus that needs to be maintained is performed. This display process is started, for example, by a user giving through the input device 305 an instruction to display the user interface. In step S501, the acquisition unit 401 acquires, from each of the exposure apparatuses 204, information regarding the operated state of the exposure apparatus 204, information regarding the operating state of the exposure apparatus 204, and information regarding the time (the state time) elapsed since the operating state has transitioned to the current state. The accumulation unit 402 saves the information acquired by the acquisition unit 401 in at least one of the RAM 303 and the storage device 304.

The information regarding the operated state includes information indicating a state regarding an operation performed on the exposure apparatus 204. The information regarding the operated state includes an Online/Remote state indicating the state where the exposure apparatus 204 is remotely operated by a host computer, and an Online/Local state indicating the state where the exposure apparatus 204 is operated by the user through an operation screen of the exposure apparatus 204. The information regarding the operated state may also include, for example, a non-maintenance state where an operation regarding maintenance is not performed on the exposure apparatus 204, and a maintenance state where an operation regarding maintenance is performed on the exposure apparatus 204.

The operating state includes a state regarding the operating status of the exposure apparatus 204. The operating state includes, for example, a Down state where the exposure apparatus 204 is stopped, a Reset state where the exposure apparatus 204 is restarted, and an MA state where the exposure apparatus 204 is stopped in need of maintenance for recovering from an abnormal state. The operating state also includes a Processing state where the exposure apparatus 204 performs the exposure process, an Idle state where the exposure apparatus 204 does not perform the exposure process, and a PM state where the exposure apparatus 204 is subjected to periodic maintenance scheduled in advance.

The information regarding the time elapsed since the operating state has transitioned to the state where the exposure apparatus 204 needs to be maintained indicates the time elapsed since the operating state has transitioned to at least one of the Down state, the Reset state, and the MA state. Although the Down state is the state where the exposure apparatus 204 is stopped, there is a possibility that the exposure apparatus 204 is stopped due to some kind of abnormality. Thus, the Down state is included in the state where the exposure apparatus 204 needs to be maintained. Although the Reset state is the state where the exposure apparatus 204 is restarted, the exposure apparatus 204 is often restarted due to some kind of abnormality. Thus, the Reset state is included in the state where the exposure apparatus 204 needs to be maintained. There is also a possibility that the exposure apparatus 204 stops while restarting, or it takes time for the exposure apparatus 204 to restart. Thus, the Reset state is included in the state where the exposure apparatus 204 needs to be maintained. That is, the state where the exposure apparatus 204 needs to be maintained in the operating state is the state where there is a possibility that the exposure apparatus 204 cannot perform the exposure process due to some kind of abnormality.

In step S502, the calculation unit 403 identifies apparatuses to be displayed on a screen of the display device 306 as apparatuses that need to be maintained, based on the information regarding the operated state and the information regarding the operating state that are acquired in step S501.

A specific description is given of a method for identifying apparatuses to be displayed on the screen of the display device 306 as apparatuses that need to be maintained. FIG. 6 is a diagram illustrating the operated state, the operating state, and the state time of each of the exposure apparatuses 204. In the example illustrated in FIG. 6, apparatuses A, B, and C, apparatuses D, E, and F, and apparatuses G, H, and I are placed in three factories X, Y, and Z. The calculation unit 403 identifies the apparatuses A, B, C, E, F, G, H, and I, of which the operated state is the Online/Remote state, based on the information regarding the operated state. The reason for not identifying an apparatus of which the operated state is the Online/Local state is that it is determined that an apparatus in the Online/Local state is already operated for maintenance by the user. In a case where the information regarding the operated state includes the non-maintenance state where an operation regarding maintenance is not performed on the exposure apparatus 204, an apparatus of which the operated state is the non-maintenance state may be identified. That is, the calculation unit 403 identifies an apparatus of which the operated state is the state where the apparatus is not subjected to an operation regarding maintenance.

The calculation unit 403 then identifies the apparatuses A, F, H, and I, of which the operating state is the Reset state, the MA state, or the Down state, among the apparatuses identified based on the information regarding the operated state. That is, the calculation unit 403 identifies an apparatus of which the operating state is the state where the apparatus needs to be maintained. Although apparatuses of which the operating state is the Reset state, the MA state, or the Down state are identified in this case, the operating state is not limited to these states. If there is any other state where an apparatus needs to be maintained, an apparatus in this state may be identified.

Figure 7:
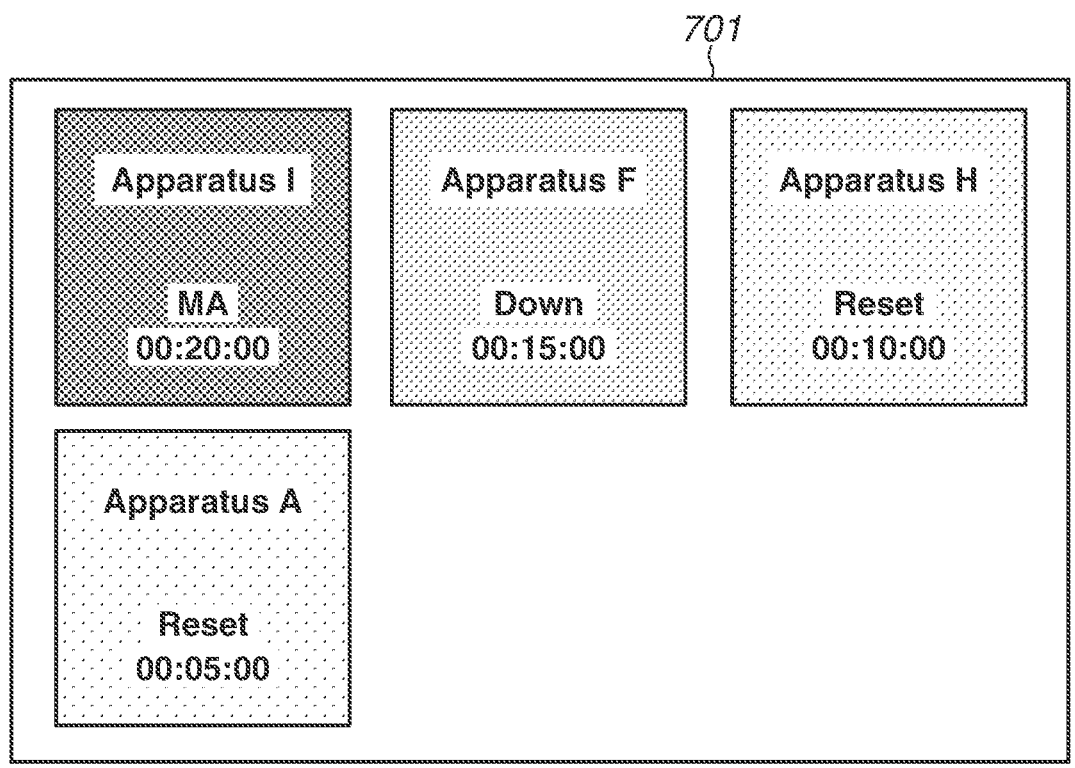
FIG. 7 illustrates a screen for displaying information regarding apparatuses according to a first exemplary embodiment.

In step S503, the output unit 404 outputs to the display device 306 the information regarding the apparatuses A, F, H, and I identified in step S503 and displays a screen as illustrated in FIG. 7 on the display device 306. FIG. 7 is a diagram illustrating the screen for displaying the information regarding the apparatuses. A screen 701 displays, as the information regarding each of the apparatuses that need to be maintained, the name of the apparatus, the operating state of the apparatus, and the time elapsed since the operating state has transitioned to the current operating state. Although not illustrated in the example of FIG. 7, the operated state may be displayed as the information regarding each of the apparatuses that need to be maintained.

On the screen 701, the output unit 404 may determine whether the time elapsed since the operating state has transitioned to the current operating state is greater than a predetermined threshold, and identify the information regarding the displayed apparatuses. This is because an apparatus in which the time elapsed since the apparatus has entered the state where the apparatus needs to be maintained is long should be maintained in preference to an apparatus in which the elapsed time is short.

On the screen 701, the output unit 404 may perform control to highlight the information regarding the apparatuses in descending order of the time elapsed since the operating state has transitioned to the current operating state. As a highlighting method, for example, the longer the time elapsed since the operating state has transitioned to the current operating state is, the more prominent the background color of a region where the information regarding the apparatus is displayed on the screen 701 may be. Alternatively, as the highlighting method, for example, the longer the time elapsed since the operating state has transitioned to the current operating state is, the more prominent the color of the characters with which the information regarding the apparatus is displayed on the screen 701 may be. On the screen 701, the information regarding the apparatuses may be displayed in descending order of the time elapsed since the operating state has transitioned to the current operating state.

As described above, it is possible to display, on a screen of a display device, apparatuses that need to be maintained, based on an information processing apparatus according to the present exemplary embodiment. The user can therefore identify an apparatus that needs to be preferentially maintained.

Next, an information processing apparatus according to a second exemplary embodiment is described. Items that are not mentioned in the present exemplary embodiment can conform to the first exemplary embodiment. In the present exemplary embodiment, the information regarding the apparatuses is displayed on the screen displayed in step S503 based on information regarding locations (e.g., factories) where the apparatuses that should be maintained are placed. For example, in a case where a plurality of apparatuses that should be maintained is present in a same factory, and if the user collectively maintains the apparatuses in the same factory, the user can save the time taken to move between factories, and therefore can efficiently maintain the apparatuses. It is thus desirable to maintain the apparatuses in preference to apparatuses in another factory. In response, in a factory where apparatuses to be preferentially maintained are placed, information regarding other apparatuses that should be maintained is displayed, whereby the user can efficiently identify an apparatus that can be maintained among the apparatuses that need to be maintained.

A description is given of a display process for displaying a user interface for identifying an apparatus that needs to be maintained according to the present exemplary embodiment.

In step S501 illustrated in FIG. 5, the acquisition unit 401 acquires information regarding a factory where the apparatus is placed, in addition to the information regarding the operated state, the information regarding the operating state, and the information regarding the state time. The information regarding the factory where the apparatus is placed includes information indicating the factory X for the apparatus A and the factory Y for the apparatus D in the example of FIG. 6.

In step S502, the calculation unit 403 identifies the apparatuses A, F, H, and I similarly to the first exemplary embodiment. The calculation unit 403 then identifies the apparatus I in which the elapsed time is the longest, based on the information regarding the time elapsed since the operating state has transitioned to the state where the apparatus needs to be maintained. The calculation unit 403 then identifies the factory Z for the apparatus I, based on the information regarding the factory where the apparatus is placed. The calculation unit 403 identifies the apparatuses G, H, and I, which are placed in the factory Z, as apparatuses to be displayed on the screen of the display device 306.

Figure 8:
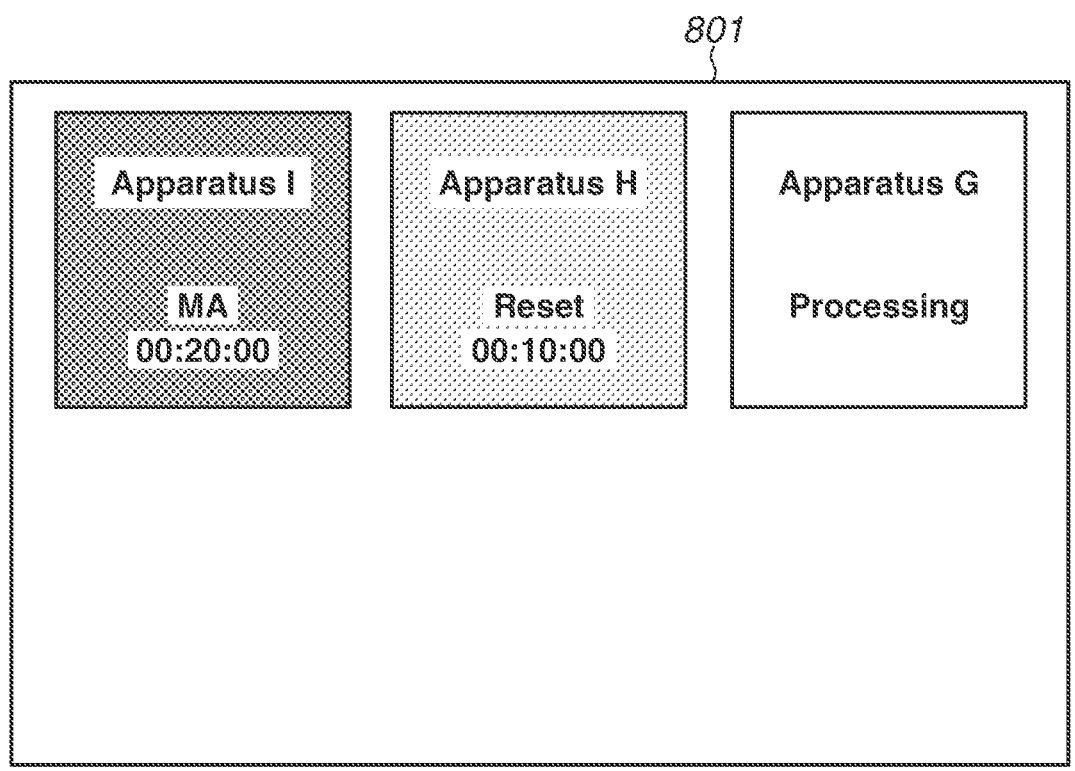
FIG. 8 illustrates a screen for displaying information regarding apparatuses according to a second exemplary embodiment.

In step S503, the output unit 404 outputs to the display device 306 the information regarding the apparatuses G, H, and I identified in step S503 and displays a screen as illustrated in FIG. 8 on the display device 306. FIG. 8 is a diagram illustrating the screen for displaying the information regarding the apparatuses. A screen 801 displays the information regarding the apparatuses G, H, and I identified in step S502. The user confirms the screen 801 and thereby can identify an apparatus that should be maintained among the apparatuses placed in the same factory. Although the information regarding the apparatus G, which should not be maintained, is also displayed in the example of FIG. 8, information regarding an apparatus that should not be maintained may not be displayed.

In the present exemplary embodiment, apparatuses are classified according to factories where the apparatuses are placed. The present invention, however, is not limited to this. For example, in a case where a plurality of manufacturing lines is present in the same factory, apparatuses may be classified into apparatuses placed in the respective manufacturing lines. Alternatively, in a case where, for example, a plurality of buildings is present in the same factory, apparatuses may be classified into apparatuses placed in the respective buildings. That is, apparatuses may be classified into apparatuses placed in locations in certain ranges where the apparatuses can be collectively maintained.

As described above, based on the information processing apparatus according to the present exemplary embodiment, it is possible to display apparatuses that need to be maintained on a screen of a display device. The user can thereby identify an apparatus that needs to be maintained. Further, the user can identify an apparatus that should be maintained among apparatuses placed in locations where the apparatuses can be collectively maintained.

Next, an information processing apparatus according to a third exemplary embodiment is described. Items that are not mentioned in the present exemplary embodiment can conform to the first and second exemplary embodiments. In the present exemplary embodiment, a screen for displaying a list of pieces of information regarding the operating state of an apparatus that should be maintained is displayed on the screen displayed in step S503, in addition to the screen for displaying the information regarding the apparatuses.

A description is given of a display process for displaying a user interface for identifying an apparatus that needs to be maintained according to the present exemplary embodiment.

In step S501 in FIG. 5, the acquisition unit 401 acquires information regarding an error that has occurred in the apparatus, in addition to the information regarding the operated state, the information regarding the operating state, and the information regarding the state time. The information regarding the error includes, for example, information regarding an error code and an error factor. The error code is a code for identifying the error that has occurred in the apparatus. The error code may be a number, such as "101" or "305", or may be a character string, such as "AAA" or "BBB". The error factor indicates the factor of the error that has occurred in the apparatus. Examples of the error factor include a measurement error in the measurement of the position of a stage by a laser interferometer, and an initialization error in which the initialization of a unit is failed while the apparatus restarts.

In step S502, the calculation unit 403 identifies apparatuses to be displayed on the screen of the display device 306 similarly to the first or second exemplary embodiment.

Figure 9:
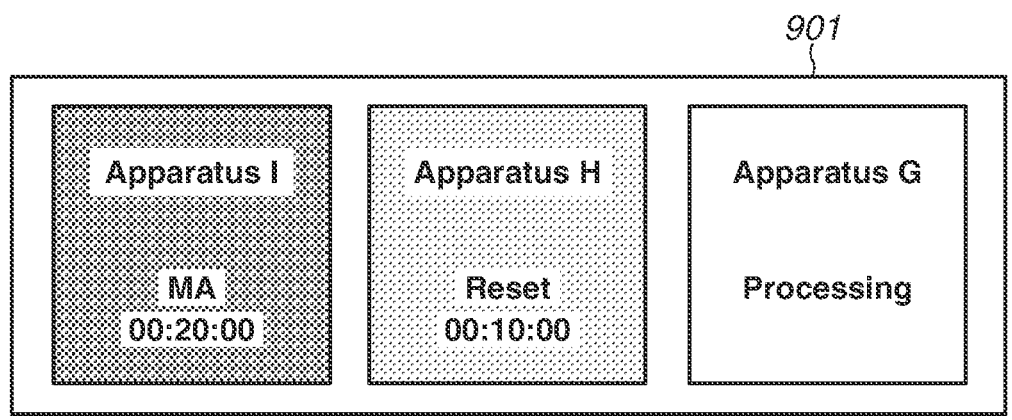
FIG. 9 illustrates a screen for displaying information regarding apparatuses according to a third exemplary embodiment.

In step S503, the output unit 404 adds the information regarding the error code and the error factor as the information regarding the apparatuses, outputs the resulting information to the display device 306, and displays a screen as illustrated in FIG. 9 on the display device 306. FIG. 9 is a diagram illustrating the screen for displaying the information regarding the apparatuses. A screen 901 displays the information regarding the apparatuses G, H, and I identified in step S502. A screen 902 displays the information regarding the error that has occurred in the apparatus in addition to the operating state and the state time, for each of the apparatuses I and H, which need to be maintained. In the example illustrated in FIG. 9, the error code and the error factor of the error that has occurred in the apparatus are displayed, as the information regarding the error. The user can also identify an apparatus that should be preferentially maintained based on the information regarding the error that has occurred in the apparatus and displayed on the screen 902.

Figure 10:
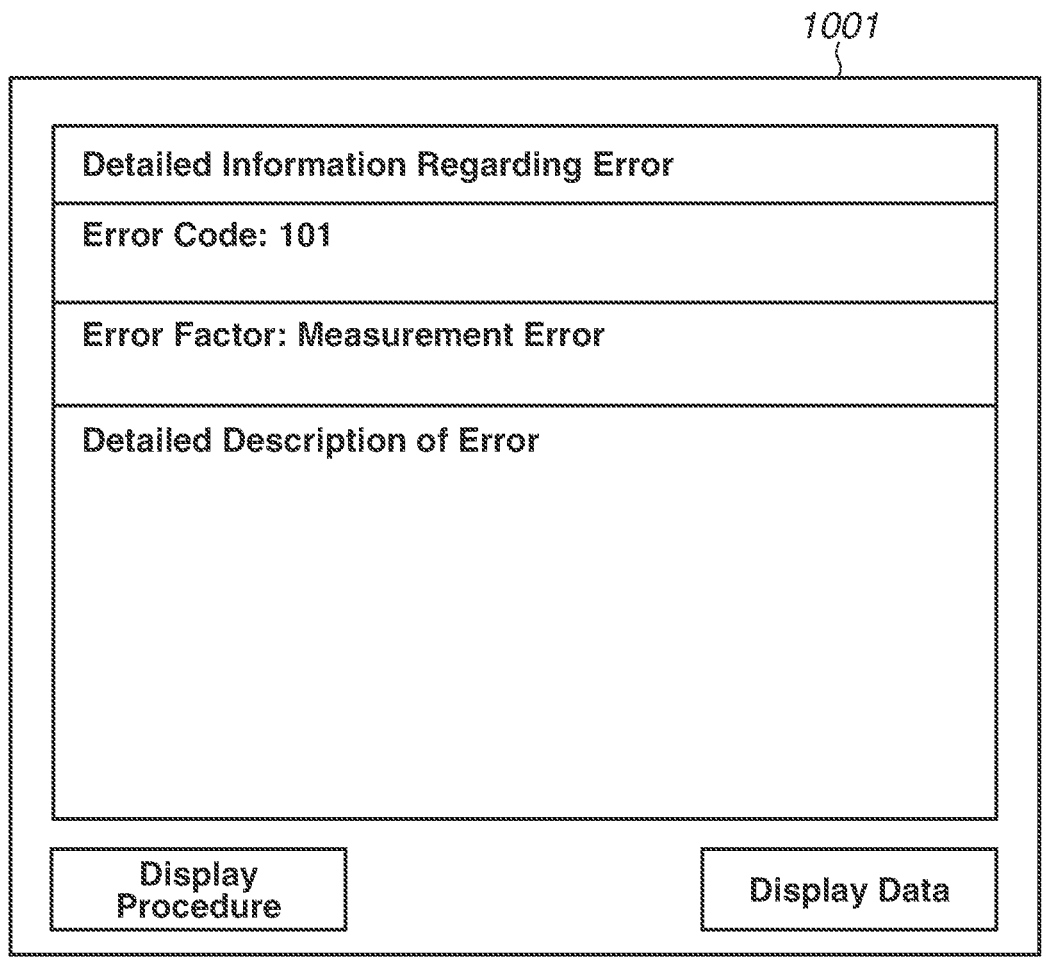
FIG. 10 illustrates a screen for displaying detailed information regarding an error according to the third exemplary embodiment.

On the screen 902, the user may indicate a displayed apparatus through the input device 305, whereby the output unit 404 may perform control to display on the display device 306 a screen for displaying detailed information regarding the error that has occurred in the apparatus. FIG. 10 is a diagram illustrating the screen for displaying the detailed information regarding the error. A screen 1001 for displaying the detailed information regarding the error displays the detailed description of the information regarding the error in addition to the error code and the error factor. The detailed description of the error includes, for example, information regarding the condition under which the error occurs, and the range of influence of the error that has occurred.

The screen 1001 also displays a procedure display button for displaying a procedure for maintaining the apparatus in which the displayed error has occurred, and a data display button for displaying data regarding the displayed error.

If the user selects the procedure display button on the screen 1001 through the input device 305, the output unit 404 performs control to display on the display device 306 a screen for displaying the procedure for maintaining the apparatus in which the error has occurred. Information regarding the procedure corresponding to the error that has occurred is stored in advance in the storage device 304, and the acquisition unit 401 acquires the information regarding the procedure corresponding to the error displayed on the screen 1001. FIG. 11 is a diagram illustrating the screen for displaying the procedure for maintaining the apparatus. A screen 1101 for displaying the procedure for maintaining the apparatus in which the error has occurred displays, for example, the procedure for maintaining the apparatus in which the error has occurred. On the screen 1101, the user can confirm the procedure for maintaining the apparatus in which the error has occurred. In a case where there is a plurality of maintenance procedures for maintaining the apparatus in which the error has occurred, the plurality of maintenance procedures (e.g., procedures 1 to 10) is displayed. If the user selects a particular procedure on the screen 1101 through the input device 305, the output unit 404 may perform control to display a screen where the details of the selected procedure are described. If a particular procedure is selected, the output unit 404 may perform control to display a moving image for describing the details of the selected procedure. The output unit 404 may perform control to display the display content of the screen 1101 by changing the display content according to the attribute of the user logged into the management apparatus 300. For example, the display content of the screen 1101 is changed according to the skill level of performing maintenance as the attribute of the user. In a case where, for example, a user at a high skill level of performing maintenance is logged in, a procedure that requires a high skill level, such as the replacement or the adjustment of a unit within the apparatus, is displayed. In contrast, in a case where a user at a low skill level of performing maintenance is logged in, a procedure that requires a high skill level is hidden, or a message is displayed that indicates that the user does not have authority to view a procedure that requires a high skill level.

Figure 12:
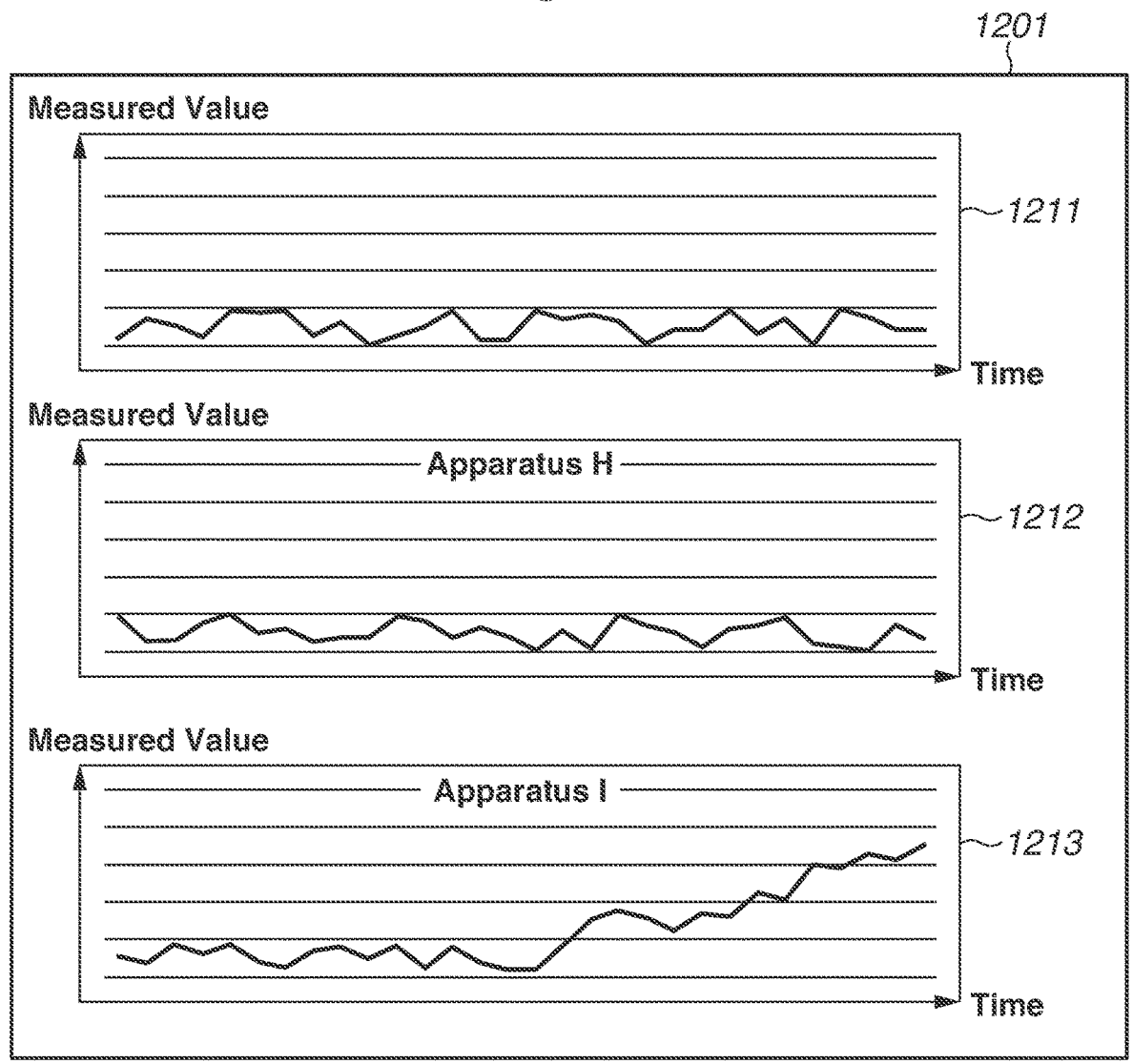
FIG. 12 illustrates a screen for displaying data regarding the error according to the third exemplary embodiment.

If the user selects the data display button on the screen 1001 through the input device 305, the output unit 404 performs control to display on the display device 306 a screen for displaying data regarding the error. FIG. 12 is a diagram illustrating the screen for displaying the data regarding the error. For example, if the error factor is a measurement error in the amount of exposure, a screen 1201 for displaying the data regarding the error displays a graph of time-series data regarding the measured value of the amount of exposure. The screen 1201 for displaying the data regarding the error may display the data regarding the error not only in a graph of time-series data, but also in any form in which the data regarding the error can be visually recognized.

In the example of FIG. 12, a graph 1211 is data indicating the average value of the measured values of a plurality of apparatuses. A graph 1212 is data indicating the measured value of the apparatus H. A graph 1213 is data indicating the measured value of the apparatus I. On the screen 1201, the user can recognize that the data of the measured value of the apparatus I is different in tendency from the data of the measured value of another apparatus. Thus, the user can determine that the apparatus I should be maintained.

As described above, it is possible to display apparatuses that need to be maintained on a screen of a display device, based on the information processing apparatus according to the present exemplary embodiment. The user can thereby identify an apparatus that needs to be maintained. Further, the user can identify an apparatus that should be preferentially maintained based on information regarding an error that has occurred in each apparatus and displayed on the screen.

Exemplary Embodiment Regarding Method for Manufacturing Article

A description is given of a method for manufacturing an article, such as a device (e.g., a semiconductor device, a magnetic storage medium, and a liquid crystal display device), a color filter, and a hard disk. This manufacturing method includes a step of forming a pattern on a substrate (e.g., a wafer, a glass plate, and a film substrate) using a pattern forming apparatus (e.g., an exposure apparatus, an imprint apparatus, and a drawing apparatus). Such manufacturing method further includes a step of processing the substrate on which the pattern is formed. This processing step can include a step of removing a residual layer of the pattern. This processing step can also include another known step such as a step of etching the substrate using the pattern as a mask. The method for manufacturing an article according to the present exemplary embodiment is advantageous over a conventional method in at least one of the performance, the quality, the productivity, and the production cost of articles.

An exposure apparatus has been described as an example of a substrate processing apparatus. The present invention, however, is not limited to this. Alternatively, as an example of the substrate processing apparatus, an imprint apparatus may be employed that brings an imprint material supplied onto a substrate and a mold (an original) into contact with each other and gives curing energy to the imprint material, thereby forming a composition to which the shape of the mold is transferred. Yet alternatively, as an example of the substrate processing apparatus, a drawing apparatus may be employed that performs drawing on a substrate with a charged particle beam (e.g., an electron beam or an ion beam) through a charged particle optical system, thereby forming a pattern on the substrate. Examples of the substrate processing apparatus can also include an apparatus that performs a step other than the steps performed by the above-described apparatuses, such as the exposure apparatus in the manufacturing of an article including a device. This apparatus is, for example, an application apparatus that applies a photosensitive medium onto the surface of a substrate, or a developing apparatus that develops a substrate to which a pattern is transferred. Examples of the substrate processing apparatus can also include an apparatus that inspects a processed substrate, such as an overlay inspection apparatus, a line width inspection apparatus, a pattern inspection apparatus, and an electrical characteristic inspection apparatus.

Not only can the first to third exemplary embodiments be carried out individually, but also the first to third exemplary embodiments can be carried out by combining any of the first to third exemplary embodiments.

According to the present invention, a technique advantageous for identifying an apparatus that needs to be preferentially maintained is provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-079054, filed Apr. 28, 2020, which is hereby incorporated by reference herein in its entirety.

What is claimed is:

1. An information processing apparatus for controlling display on a user interface, the information processing apparatus comprising:
one or more processors; and
at least one memory storing executable instructions, which when executed by the one or more processors, cause the information processing apparatus to:
acquire information about a plurality of apparatuses including operated state information indicating a respective operated state of each of the plurality of apparatuses regarding an operation being performed on each of the plurality of apparatuses, operating state information indicating a respective operating state of each of the plurality of apparatuses regarding an operating status of each of the plurality of apparatuses, elapsed time information indicating, for each of the plurality of apparatuses that needs to be maintained, respective time elapsed since the respective operating state of each of the plurality of apparatuses that needs to be maintained has transitioned to a current operating state where each of the plurality of apparatuses needs to be maintained, and location information indicating a respective location where each of the plurality of apparatuses is placed;
identify a first apparatus of the plurality of apparatuses as an apparatus to be displayed based on the information about the plurality of apparatuses indicating that an operated state of the first apparatus is a state where the first apparatus is remotely operated, an operating state of the first apparatus is a state where the first apparatus needs to be maintained, and a time elapsed since the operating state of the first apparatus has transitioned to a current operating state of the first apparatus which is the state where the first apparatus needs to be maintained is longest among each of the plurality of apparatuses that needs to be maintained and is remotely operated;
identify a second apparatus of the plurality of apparatuses as another apparatus to be displayed based on the information about the plurality of apparatuses indicating that an operated state of the second apparatus is a state where the second apparatus is remotely operated, an operating state of the second apparatus is a state where the second apparatus needs to be maintained, and the second apparatus is located at a location within a same range as the first apparatus; and
control display, on the user interface, of information about the first apparatus identified as the apparatus to be displayed and information about the second apparatus identified as the another apparatus to be displayed.

2. The information processing apparatus according to claim 1, wherein the state where the first apparatus needs to be maintained is a state where the first apparatus is stopped.

3. The information processing apparatus according to claim 1, wherein the state where the first apparatus needs to be maintained is a state where the first apparatus is restarted.

4. The information processing apparatus according to claim 1, wherein the state where the first apparatus needs to be maintained is a state where the first apparatus is in need of maintenance for recovering from an abnormal state.

5. The information processing apparatus according to claim 1, wherein the state where the first apparatus needs to be maintained is a state where the first apparatus cannot perform a process due to an abnormality.

6. The information processing apparatus according to claim 1, wherein the information about the first apparatus displayed on the user interface includes information indicating the operating state of the first apparatus, and
wherein the information about the second apparatus displayed on the user interface includes information indicating the operating state of the second apparatus.

7. The information processing apparatus according to claim 1, wherein the information about the first apparatus displayed on the user interface includes information indicating the time elapsed since the operating state of the first apparatus has transitioned to the state where the first apparatus needs to be maintained, and
wherein the information about the second apparatus displayed on the user interface includes information indicating a time elapsed since the operating state of the second apparatus has transitioned to the state where the second apparatus needs to be maintained.

8. The information processing apparatus according to claim 1, wherein the information about the first apparatus displayed on the user interface includes information indicating the current operating state of the first apparatus and information indicating the time elapsed since the operating state of the first apparatus has transitioned to the current operating state of the first apparatus.

9. The information processing apparatus according to claim 1, wherein the executable instructions, when executed by the one or more processors, cause the information processing apparatus to control display of the information about the first apparatus and the information about the second apparatus such that the information about the first apparatus displayed on the user interface is distinguishable in appearance from the information about the second apparatus displayed on the user interface based on the time elapsed since the operating state of the first apparatus has transitioned to the state where the first apparatus needs to be maintained being longer than a time elapsed since the operating state of the second apparatus has transitioned to the state where the second apparatus needs to be maintained.

10. The information processing apparatus according to claim 1, wherein the executable instructions, when executed by the one or more processors, cause the information processing apparatus to control display of the information about the first apparatus and the information about the second apparatus such that the information about the first apparatus and the information about the second apparatus are displayed on the user interface in an order based on the time elapsed since the operating state of the first apparatus has transitioned to the state where the first apparatus needs to be maintained being longer than a time elapsed since the operating state of the second apparatus has transitioned to the state where the second apparatus needs to be maintained.

11. A display control method for controlling display on a user interface, the display control method comprising:
acquiring information about a plurality of apparatuses including operated state information indicating a respective operated state of each of the plurality of apparatuses regarding an operation being performed on each of the plurality of apparatuses, operating state information indicating a respective operating state of each of the plurality of apparatuses regarding an operating status of each of the plurality of apparatuses, elapsed time information indicating, for each of the plurality of apparatuses that needs to be maintained, respective time elapsed since the respective operating state of each of the plurality of apparatuses that needs to be maintained has transitioned to a current operating state where each of the plurality of apparatuses needs to be maintained, and location information indicating a respective location where each of the plurality of apparatuses is placed;

identifying a first apparatus of the plurality of apparatuses as an apparatus to be displayed based on the information about the plurality of apparatuses indicating that an operated state of the first apparatus is a state where the first apparatus is remotely operated, an operating state of the first apparatus is a state where the first apparatus needs to be maintained, and a time elapsed since the operating state of the first apparatus has transitioned to a current operating state of the first apparatus which is the state where the first apparatus needs to be maintained is longest among each of the plurality of apparatuses that needs to be maintained and is remotely operated;

identifying a second apparatus of the plurality of apparatuses as another apparatus to be displayed based on the information about the plurality of apparatuses indicating that an operated state of the second apparatus is a state where the second apparatus is remotely operated, an operating state of the second apparatus is a state where the second apparatus needs to be maintained, and the second apparatus is located at a location within a same range as the first apparatus; and controlling display, on the user interface, of information about the first apparatus identified as the apparatus to be displayed and information about the second apparatus identified as the another apparatus to be displayed.

12. A non-transitory computer-readable storage medium storing a program for causing a computer to execute a display control method for controlling display on a user interface, the display control method comprising:

acquiring information about a plurality of apparatuses including operated state information indicating a respective operated state of each of the plurality of apparatuses regarding an operation being performed on each of the plurality of apparatuses, operating state information indicating a respective operating state of each of the plurality of apparatuses regarding an operating status of each of the plurality of apparatuses, elapsed time information indicating, for each of the plurality of apparatuses that needs to be maintained, respective time elapsed since the respective operating state of each of the plurality of apparatuses that needs to be maintained has transitioned to a current operating state where each of the plurality of apparatuses needs to be maintained, and location information indicating a respective location where each of the plurality of apparatuses is placed;

identifying a first apparatus of the plurality of apparatuses as an apparatus to be displayed based on the information about the plurality of apparatuses indicating that an operated state of the first apparatus is a state where the first apparatus is remotely operated, an operating state of the first apparatus is a state where the first apparatus needs to be maintained, and a time elapsed since the operating state of the first apparatus has transitioned to a current operating state of the first apparatus which is the state where the first apparatus needs to be maintained is longest among each of the plurality of apparatuses that needs to be maintained and is remotely operated;

identifying a second apparatus of the plurality of apparatuses as another apparatus to be displayed based on the information about the plurality of apparatuses indicating that an operated state of the second apparatus is a state where the second apparatus is remotely operated, an operating state of the second apparatus is a state where the second apparatus needs to be maintained, and the second apparatus is located at a location within a same range as the first apparatus; and controlling display, on the user interface, of information about the first apparatus and information about the second apparatus.

13. A substrate processing system comprising:

an information processing apparatus configured to control display on a user interface; and a substrate processing apparatus configured to process a substrate, wherein the information processing apparatus includes:

one or more processors; and at least one memory storing executable instructions, which when executed by the one or more processors, cause the information processing apparatus to:

acquire information about a plurality of apparatuses including operated state information indicating a respective operated state of each of the plurality of apparatuses regarding an operation being performed on each of the plurality of apparatuses, operating state information indicating a respective operating state of each of the plurality of apparatuses regarding an operating status of each of the plurality of apparatuses, elapsed time information indicating, for each of the plurality of apparatuses that needs to be maintained, respective time elapsed since the respective operating state of each of the plurality of apparatuses that needs to be maintained has transitioned to a current operating state where each of the plurality of apparatuses needs to be maintained, and location information indicating a respective location where each of the plurality of apparatuses is placed;

identify a first apparatus of the plurality of apparatuses as an apparatus to be displayed based on the information about the plurality of apparatuses indicating that an operated state of the first apparatus is a state where the first apparatus is remotely operated, an operating state of the first apparatus is a state where the first apparatus needs to be maintained, and a time elapsed since the operating state of the first apparatus has transitioned to a current operating state of the first apparatus which is the state where the first apparatus needs to be maintained is longest among each of the plurality of apparatuses that needs to be maintained and is remotely operated;

identify a second apparatus of the plurality of apparatuses as another apparatus to be displayed based on the information about the plurality of apparatuses indicating that an operated state of the second apparatus is a state where the second apparatus is remotely operated, an operating state of the second apparatus is a state where the second apparatus needs to be maintained, and the second apparatus is located at a location within a same range as the first apparatus; and control display, on the user interface, of information about the first apparatus and information about the second apparatus.

14. A method for manufacturing an article, the method comprising:

forming a pattern on a substrate using a substrate processing system;

processing the substrate on which the pattern is formed, using the substrate processing system; and manufacturing an article from the processed substrate, wherein the substrate processing system includes:

an information processing apparatus configured to control display on a user interface; and a substrate processing apparatus configured to process a substrate, wherein the information processing apparatus includes:

one or more processors; and at least one memory storing executable instructions, which when executed by the one or more processors, cause the information processing apparatus to:

acquire information about a plurality of apparatuses including operated state information indicating a respective operated state of each of the plurality of apparatuses regarding an operation being performed on each of the plurality of apparatuses, operating state information indicating a respective operating state of each of the plurality of apparatuses regarding an operating status of each of the plurality of apparatuses, elapsed time information indicating, for each of the plurality of apparatuses that needs to be maintained, respective time elapsed since the respective operating state of each of the plurality of apparatuses that needs to be maintained has transitioned to a current operating state where each of the plurality of apparatuses needs to be maintained, and location information indicating a respective location where each of the plurality of apparatuses is placed;

identify a first apparatus and of the plurality of apparatuses as an apparatus to be displayed based on the information about the plurality of apparatuses indicating that an operated state of the first apparatus is a state where the first apparatus is remotely operated, an operating state of the first apparatus is a state where the first apparatus needs to be maintained, and a time elapsed since the operating state of the first apparatus has transitioned to a current operating state of the first apparatus which is the state where the first apparatus needs to be maintained is longest among each of the plurality of apparatuses that needs to be maintained and is remotely operated;

identify a second apparatus of the plurality of apparatuses as another apparatus to be displayed based on the information about the plurality of apparatuses indicating that an operated state of the second apparatus is a state where the second apparatus is remotely operated, an operating state of the second apparatus is a state where the second apparatus needs to be maintained, and the second apparatus is located at a location within a same range as the first apparatus; and control display, on the user interface, of information about the first apparatus identified as the apparatus to be displayed and information about the second apparatus identified as the another apparatus to be displayed.

* * * * *